United States Patent
Higuchi et al.

(10) Patent No.: US 8,320,626 B2
(45) Date of Patent: Nov. 27, 2012

(54) IMAGE PROCESSING APPARATUS

(75) Inventors: Mirai Higuchi, Mito (JP); Shoji Muramatsu, Hitachinaka (JP); Soichiro Yokota, Tokyo (JP); Tatsuhiko Monji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 751 days.

(21) Appl. No.: 12/488,830

(22) Filed: Jun. 22, 2009

(65) Prior Publication Data

US 2009/0316956 A1 Dec. 24, 2009

(30) Foreign Application Priority Data

Jun. 23, 2008 (JP) ................................. 2008-163630

(51) Int. Cl.
*G06K 9/00* (2006.01)
(52) U.S. Cl. ........................................................ 382/104
(58) Field of Classification Search .................. 382/103, 382/104, 106, 107; 348/169; 701/431, 433; 340/3.41, 436, 573.1, 901, 903, 904, 937
See application file for complete search history.

(56) References Cited

U.S. PATENT DOCUMENTS

| | | | | |
|---|---|---|---|---|
| 6,163,252 | A * | 12/2000 | Nishiwaki | 340/435 |
| 6,173,066 | B1 * | 1/2001 | Peurach et al. | 382/103 |
| 7,522,747 | B2 * | 4/2009 | Horibe | 382/104 |
| 7,912,583 | B2 * | 3/2011 | Gutmann et al. | 700/245 |
| 2004/0024528 | A1 * | 2/2004 | Patera et al. | 701/301 |
| 2005/0131581 | A1 * | 6/2005 | Sabe et al. | 700/245 |
| 2005/0194973 | A1 * | 9/2005 | Kwon et al. | 324/260 |
| 2005/0232463 | A1 * | 10/2005 | Hirvonen et al. | 382/103 |
| 2006/0178828 | A1 * | 8/2006 | Moravec | 701/211 |
| 2006/0195858 | A1 * | 8/2006 | Takahashi et al. | 725/19 |
| 2007/0021904 | A1 * | 1/2007 | Kawamata et al. | 701/200 |
| 2007/0071311 | A1 * | 3/2007 | Rovira-Mas et al. | 382/154 |
| 2008/0007720 | A1 * | 1/2008 | Mittal | 356/138 |
| 2008/0097699 | A1 * | 4/2008 | Ono | 701/300 |
| 2008/0201116 | A1 * | 8/2008 | Ozdemir et al. | 703/2 |

FOREIGN PATENT DOCUMENTS

WO  WO 2007/028932 A1  3/2007

OTHER PUBLICATIONS

Christophe Coué et al., "Bayesian Occupancy Filtering for Multitarget Tracking: An Automotive Application", The International Journal of Robotics Research, vol. 25, No. 1, Jan. 2006, pp. 19-30.

Manuel Yguel et al., "Velocity Estimation on the Bayesian Occupancy Filter for Multi-Target Tracking", INRIA, ISSN 0249-6399, 2005 (Nineteen (19) pages).

* cited by examiner

*Primary Examiner* — Chan S Park
*Assistant Examiner* — Shervin Nakhjavan
(74) *Attorney, Agent, or Firm* — Crowell & Moring LLP

(57) ABSTRACT

An image processing accuracy estimation unit estimates an image processing accuracy by calculating a size of an object by which the accuracy of measurement of the distance of the object photographed by an on-vehicle camera becomes a permissible value or less. An image post-processing area determination unit determines, in accordance with the estimated image processing accuracy, a partial area inside a detection area of the object as an image post-processing area for which an image post-processing is carried out and lattices the determined image post-processing area to cells. An image processing unit processes the image photographed by the on-vehicle camera to detect a candidate for object and calculates a three-dimensional position of the detected object candidate. An image post-processing unit calculates, in each the individual cell inside the determined area the probability as to whether the detected object is present and determines the presence/absence of the object.

7 Claims, 12 Drawing Sheets

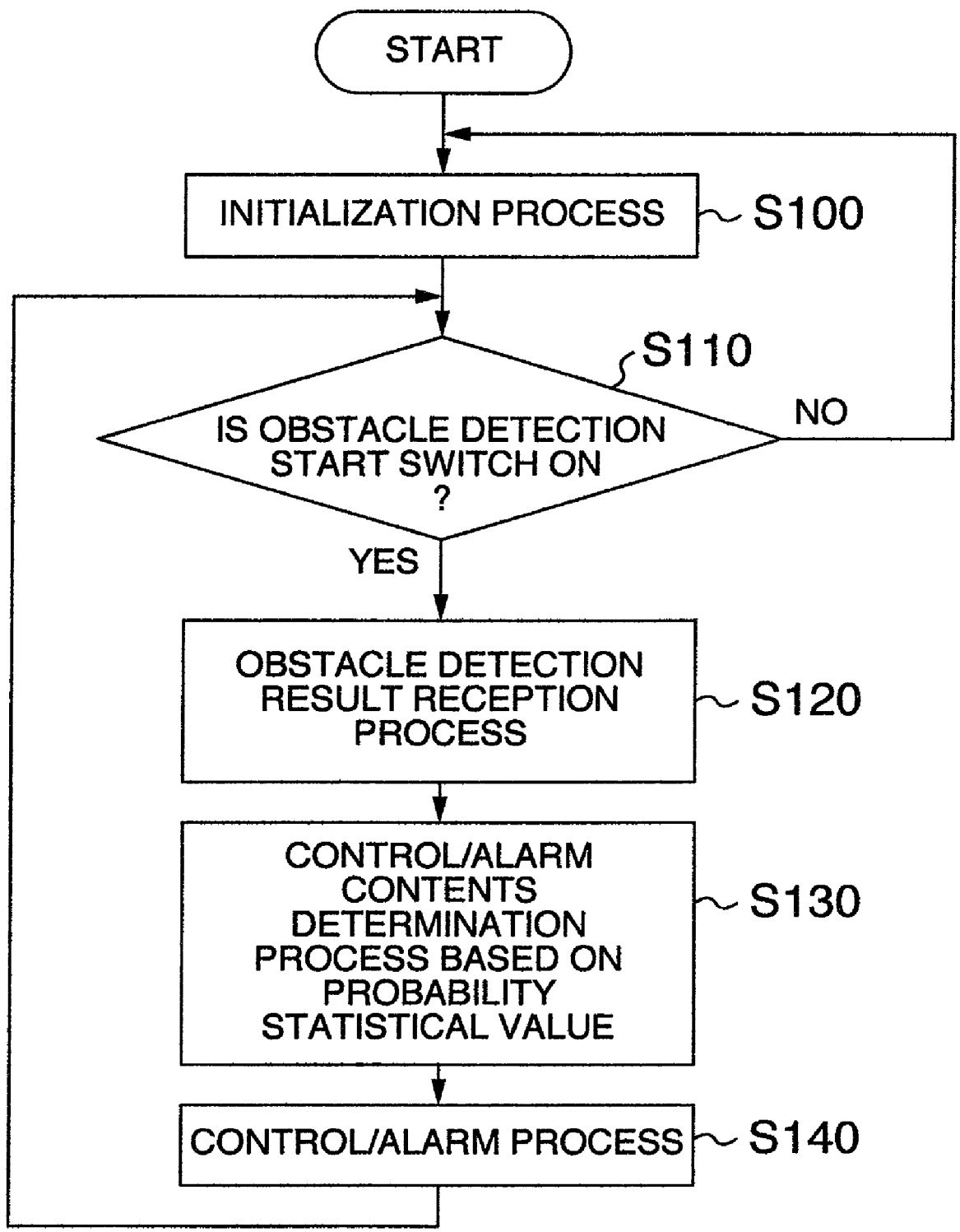

IMAGE PROCESSING APPARATUS

BACKGROUND OF THE INVENTION

The present invention relates to image processing apparatus and more particularly, to an image processing apparatus suitable for use in detecting objects such as obstacles, road surface marks and curves by using an on-vehicle camera.

Recently, an obstacle detection equipment adapted to detect obstacles such as pedestrian and vehicle by using an on-vehicle camera has been put into practice. Further, with the aim of automatic operation and operation assist in vehicles, a technique has been practiced according to which a road surface mark such as lane mark along which an own car runs is detected by processing an image picked up by an on-vehicle camera and in the event that the own-car is risky to deviate from the lane, the driver is informed of this critical condition or the car is so controlled as not to deviate. Further, a product has been marketed which is based on a technique for detecting obstacles such as pedestrians and informing the driver of the presence of a pedestrian or executing anti-collision or collision mitigation when there is a risk of colliding with the pedestrian.

In the case of processing images picked up by the on-vehicle camera to detect objects, the sunlight, the rays of head light emanating from neighboring vehicles, the water droplets sticking to the lens, the disturbance such as pitching of vehicle and shadows, the remoteness of the distance to a detection object and so on have an influence upon the processing, thus preventing the detection processing of the lane marker and obstacle from being carried out properly. Accordingly, importance is placed on a technique for not only detecting the presence/absence of objects but also determining the accuracy of the result of detection of an object in order to improve the detection performance.

To approach the problems, an expedient has been known in which the road surface is divided or latticed to cells, the probability of the presence of an object is calculated cell by cell, a decision is made from the existence probability as to whether collision with the object will occur, and a signal for avoiding the object is outputted as necessary (see WO 2007/028932 pamphlet).

SUMMARY OF THE INVENTION

The technique described in the aforementioned Patent Document is, however, unpractical and problematic in that when applying the teachings to the field of on-vehicle sensor having a wide sensing range, the number of cells (grids) of the latticed road surface increases excessively and much time is required for the image processing.

An object of the present invention is to provide an image processing apparatus which can improve the detection performance by using the existence probability and can reduce the time required for the image processing.

(1) To accomplish the above object, an image processing apparatus according to an aspect of the present invention comprises an image pickup unit, an image processing accuracy estimation unit for estimating an image processing accuracy by calculating a size of an object by which the accuracy of measurement of the distance of the object photographed by the image pickup unit becomes a permissible value or less, an image post-processing area determination unit for determining, in accordance with the image processing accuracy estimated by the image processing accuracy estimation unit, a partial area inside an object detection area as an image post-processing area in which an image post-processing is carried out and for latticing the determined image post-processing area to cells, an image processing unit for processing the image photographed by the image pickup unit to detect a candidate for object and calculating a three-dimensional position of the detected object candidate, and an image post-processing unit for calculating, in respect of the individual cells inside the latticed area determined by the image post-processing area determination unit, the probability as to whether the object held on to the image processing unit is present and for determining the presence/absence of the object.

With this construction, the detection performance can be improved by using the existence probability and the time required for image processing can be reduced.

(2) Preferably in (1) as above, the image post-processing area determination unit determines as the image post-processing area, an area for which an error in the distance measurement estimated by the image processing accuracy estimation unit is larger than a permissible error.

(3) Preferably in (1) as above, the image post-processing area determination unit determines as the image post-processing area, an area for which the size on a photographed image of the detection object estimated by the image processing accuracy estimation unit is smaller than a predetermined value.

(4) Preferably in (1) as above, the image post-processing area determination unit determines, inside the image post-processing area and on the basis of the image processing accuracy, the resolution which decreases proportionately to the remoteness and lattices the image post-processing area to cells on the basis of the resolution.

(5) Preferably in (1) as above, the image post-processing unit calculates the existence probability through probability statistical process.

(6) Preferably in (5) as above, the image post-processing unit delivers an output by adding a probability statistical value such as probability or variance of the object existence to the result of recognition of the recognition object.

(7) Preferably in (6) as above, the image processing apparatus further comprises a control unit for determining the contents of control and alarm on the basis of the recognition result of the recognition object and probability statistical value concerning the object the image post-processing area determination unit delivers.

According to the present invention, the detection performance can be improved by using the existence probability and the time required for the image processing can be shortened.

Other objects, features and advantages of the invention will become apparent from the following description of the embodiments of the invention taken in conjunction with the accompanying drawings.

BRIEF DESCRIPTION OF THE DRAWINGS

FIG. 4 is a flowchart showing operation of a control unit connected to the image processing apparatus in the embodiment.

DESCRIPTION OF THE EMBODIMENTS

By making reference to FIGS. 1 to 9, construction and operation of an image processing apparatus according to an embodiment of the present invention will now be described.

Figure 1:
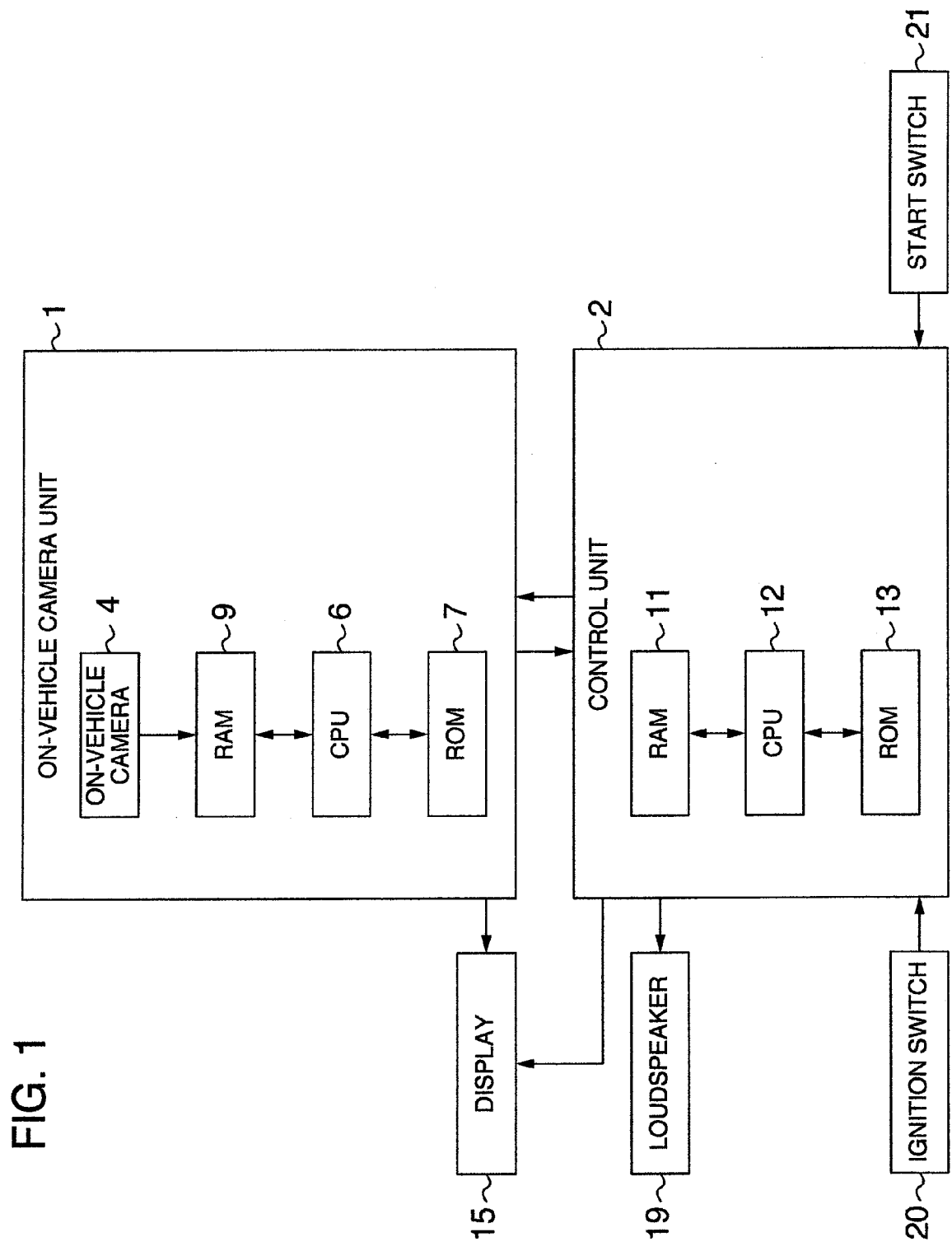
FIG. 1 is a block diagram illustrating the configuration of an on-vehicle system using an image processing apparatus according to an embodiment of the invention.

Referring first to FIG. 1, the configuration and operation of an on-vehicle system used in the image processing apparatus in the present embodiment of the invention will be described.

The image processing apparatus in the present embodiment is applied to an on-vehicle camera unit (image processing equipment) 1 as shown in FIG. 1. The on-vehicle camera unit 1 implements the function to recognize an environment surrounding a vehicle by means of an on-vehicle camera (image pickup unit) 4 the on-vehicle camera unit 1 includes. Alternatively, in the configuration, two or more on-vehicle cameras may be provided. In an alternative, an image processing unit separated from the on-vehicle camera unit 1 may fetch an image from the on-vehicle camera 4 and may process it.

The on-vehicle camera unit 1 is mounted on a car so as to be applied to the on-vehicle system. The on-vehicle system is an equipment in which the on-vehicle camera unit 1 detects an obstacle present frontally of the car (hereinafter referred to as "an own car") and on the basis of the detection result, the own car is controlled or a driver is informed of a risk under the control of a control unit 2.

The on-vehicle camera unit 1 further includes a CPU 6, a RAM 9 and a ROM 7. The control unit 2 includes a CPU 12, a RAM 11 and a ROM 13. Then, in the on-vehicle system comprising on-vehicle camera unit 1 and control unit 2, the on-vehicle camera unit 1 and the control unit 2 are interconnected with each other. Connected to the on-vehicle system are a display 15 installed in a compartment and adapted to display various kinds of images and various kinds of information, a loudspeaker 19 adapted to issue an alarming sound in an emergency of collision of the own car with an obstacle, an ignition switch 20 to be turned on when starting the engine and an obstacle detection start switch 21 to be turned on when starting obstacle detection. Operation of the whole of the on-vehicle system including display control of the display 15 is controlled with the control unit 2.

The on-vehicle camera unit 1 is attached to, for example, a room mirror inside the compartment of the own car and is operative to photograph the scene frontal of the own car at a predetermined angle of depression making to the camera attaching position. An image in front of the own car photographed by the on-vehicle camera 4 (hereinafter referred to as "s picked up image") is fetched to the RAM 9 inside the on-vehicle camera unit 1. The on-vehicle camera unit 1 detects an obstacle frontal of the own car on the basis of the picked up image and when determining that the own car is risky to collide with the obstacle, causes the result of detection to be drawn on an image the display 15 displays. Also, under the control of the control unit 2, the display 15 and loudspeaker 19 or either the display 15 or the loudspeaker 19 is activated to give information to this effect to the driver. Alternatively, the brake and steering of the own car can be controlled by means of the control unit 2 to avoid or mitigate collision.

The display 15 is formed of a display device such as, for example, an LCD (Liquid Crystal Display). The display 15 is controlled for display by means of the control unit 2 to thereby display various kinds of images including, for example, an image of running course guidance based on navigation not shown and an image by the on-vehicle camera unit 1. When an obstacle is recognized, the display 15 displays under the control of the control unit 2 a message or image to make a report of the presence of the obstacle.

The control unit 2 includes the CPU 12, RAM 11 and ROM 13 which are coupled together through buses. By executing various kinds of control programs stored in the ROM 13, the CPU 12 controls the operation of the whole system.

In the on-vehicle camera unit 1, an obstacle detection program for detection of obstacles is stored in the ROM 7. The function to detect obstacles is implemented through execution of the program by the CPU 6.

Figure 2:
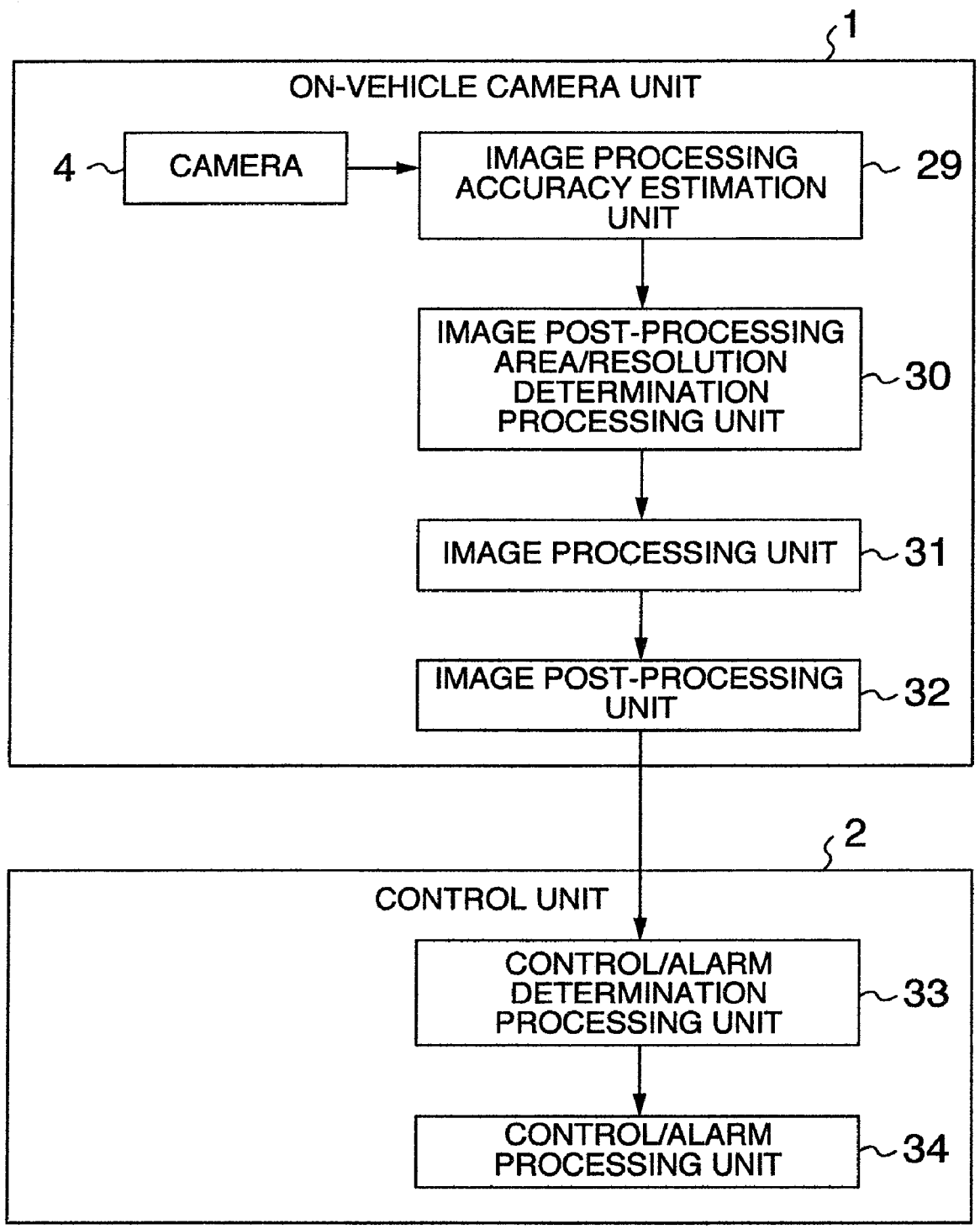
FIG. 2 is a functional block diagram showing the construction of the on-vehicle system using the image processing apparatus in the embodiment.

Turning now to FIG. 2, the functional construction and operation of the on-vehicle system using the image processing apparatus of the present embodiment will be described.

The on-vehicle system using the image processing apparatus according to the present embodiment is constructed as illustrated in functional block diagram form in FIG. 2.

When the ignition switch 20 shown in FIG. 1 is turned on and the engine starts, the obstacle detection program in the ROM 7 is executed. As a result, the on-vehicle camera unit 1 functions as an image processing accuracy estimation unit 29, an image post-processing area determination unit 30, an image processing unit 31 and an image post-processing unit 32, as shown in FIG. 2. The control unit 2, on the other hand, functions as a control/alarm determination processing unit 33 and a control/alarm processing unit 34.

The image processing accuracy estimation unit 29 has the function to estimate the accuracy of calculation of a three-dimensional position of an object or the accuracy of detection of an object. The detailed function of the image processing accuracy estimation unit 29 will be described later.

Functionally, the image post-processing area determination unit 30 responds to the calculation accuracy of three-dimensional position of an object or the detection accuracy of the object which is the result by the image processing accuracy estimation unit 29 to determine an area in which the image post-processing is executed and a resolution as well and responds to the determined processing area and resolution to lattice the processing area to cells. The detailed function of the image post-processing area determination unit 30 will be described later with reference to FIGS. 5 and 6.

The image processing unit 31 has the function to process an image picked up by the on-vehicle camera 4 to detect a candidate for object through, for example, pattern matching and calculate a three-dimensional position of the detected object candidate. The processing by the image processing unit 31 has hitherto been familiar.

Functionally, the image post-processing unit 32 calculates the probability as to whether or not an object exists in each cell of the processing area latticed by the image post-processing area determination unit 30 and also calculates, by making discrete the direction in which the cell is moving, the probability as to which direction the cell moves in, thus forming a probability map. Then, the image post-processing unit 32 decides the presence or absence of an object in accordance with whether or not the probability in the formed probability map is in excess of a threshold value and besides delivers an output indicative of the position and size of the object and the probability as well. Details of the function of the image post-processing unit 32 will be described later.

The control/alarm determination processing unit 33 functions on the basis of the result of the image post-processing unit 32 to make a decision as to whether or not control of brake, accelerator and steering is to be done and whether or not the alarm processing is to be done. Details of the function of the control/alarm determination unit 33 will be described later with reference to FIG. 9.

The control/alarm processing unit 34 functions on the basis of the result of determination by the control/alarm determination processing unit 33 to execute a process of transmitting a control signal to an actuator or to execute a process of informing the driver of a risk by using the display, loudspeaker and the like. The processing by the control/alarm processing unit 34 has hitherto been familiar.

In the on-vehicle camera unit 1 constructed as above, when the CPU 6 executes the obstacle detection program, the image can be processed and the probability statistical value can be calculated in addition to the position and size of the object. Then, an image in which, for example, the recognition result is superimposed on an input image is outputted to the display 15 and the recognition result is transmitted to the control unit 2 and if a risk of collision is determined under the control of the control unit 2, a control operation for mitigation or avoidance of collision is carried out or either issuance of an alarm sound or display of an alarm image is carried out to inform the vehicle driver of the emergency.

Figure 3:
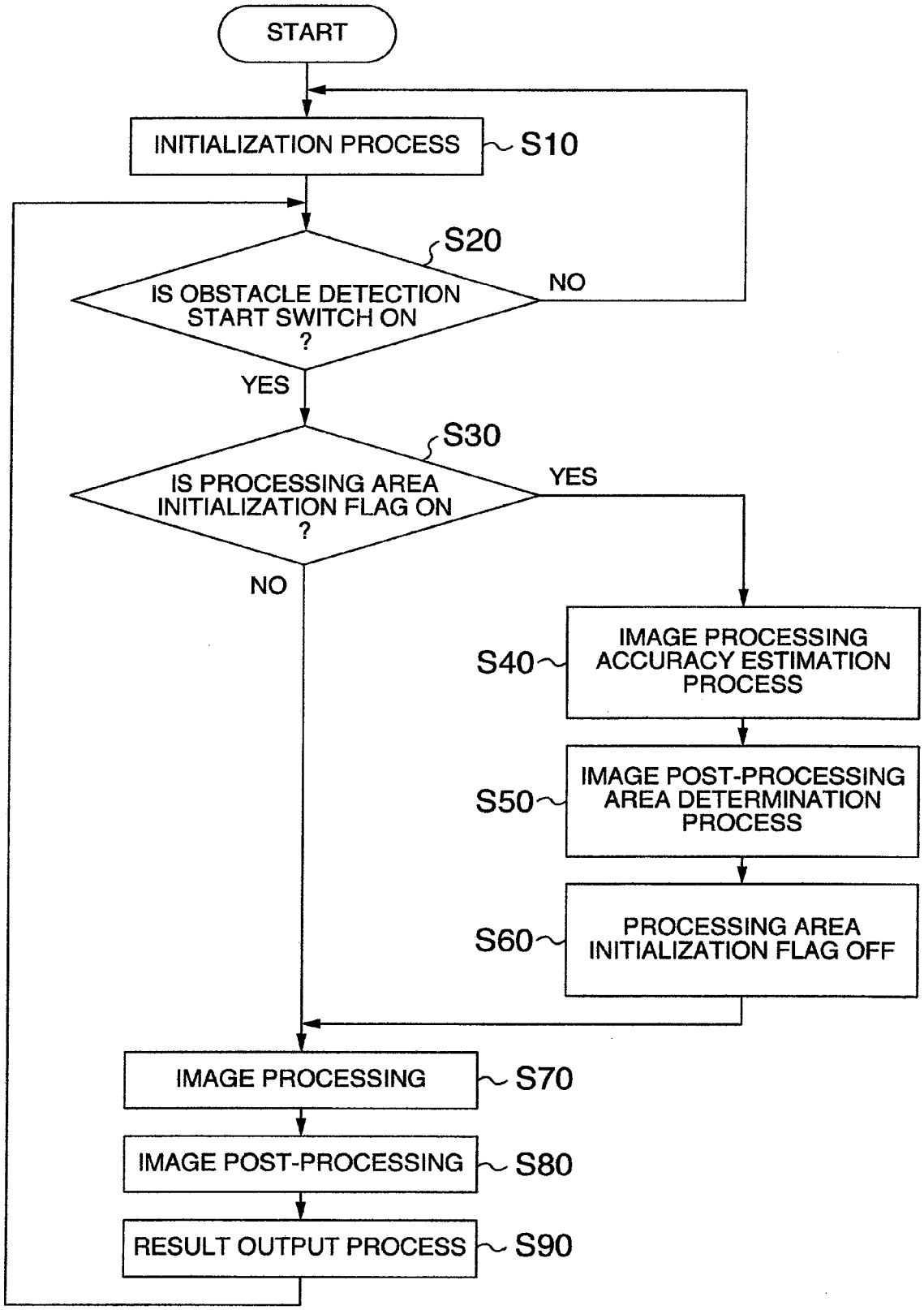
FIG. 3 is a flowchart showing operation of the image processing apparatus in the embodiment.

Referring now to FIG. 3, operation of the image processing apparatus according to the present embodiment will be described. Illustrated in FIG. 3 is a flowchart showing an example of operation of the image processing apparatus according to the present embodiment of the invention.

Flow of a series of procedures ranging from detection of an obstacle to delivery of a detection result in the on-vehicle camera unit 1 is shown in FIG. 3. The procedure shown in FIG. 3 is started when the ignition switch 20 in FIG. 1 is turned on and is repeated until the ignition switch 20 is turned off. The procedure is practiced irrespective of the fact that the own car is running or stopping or the fact that the image displayed on the display 15 is a running route guidance image of navigation system or other images. But, structurally, execution of the procedures may be determined in compliance with either the condition of running or stoppage of the own car or the condition of the display on the display 15 being a running route guidance image of navigation system or other images.

Firstly, when the ignition switch 20 is turned on, the on-vehicle camera unit 1 executes the obstacle detection program, carrying out an initialization process in step S10. In the initialization process, a processing area initialization flag is set to ON.

Next, in step S20, the on-vehicle camera unit 1 decides whether or not the obstacle detection start switch 21 is ON. With the obstacle detection start switch 21 turned on, it is decided in step S30 whether or not the processing area initialization flag is ON. With the processing area initialization flag turned on, the image processing accuracy estimation unit 29 executes an image processing accuracy estimation process in step S40. Details of the image processing accuracy estimation process will be described later.

Further, in step S50, the image post-processing area determination unit 30 executes an image post-processing area determining process. Thereafter, in step S60, the on-vehicle camera unit 1 sets the initialization flag to OFF.

When the initialization process ends, the program proceeds from step S30 to step S70 in which the image processing unit 31 detects candidates for an object and calculates three-dimensional position and size of each of the object candidates.

Next, in step S80, the image post-processing unit 32 calculates, on the basis of the result of detection of the object candidate, a probability of existence of an object. Also, in step S90, the image post-processing unit 32 determines, out of the results of detection of object candidates, an object candidate having an existence probability of a threshold value or more as an obstacle and outputs its position, size and existence probability.

On the basis of obstacle data determined as above, the control unit 2 determines the contents of control and alarm and performs a process for controlling the car or issuing an alarm to the driver or a process for not only controlling the car and but also issuing an alarm to the driver.

Turning now to FIG. 4, operation of the control unit 2 connected to the image processing apparatus according to the present embodiment will be described.

Illustrated in FIG. 4 is a flowchart showing an example of operation of the control unit connected to the image processing apparatus according to the present embodiment.

Flow of a series of procedures shown in FIG. 4 is started when the ignition switch 20 is turned on and is repeated until the ignition switch 20 is turned off. The procedure is practiced irrespective of the fact that the own car is running or stopping or the fact that the image displayed on the display 15 is a running route guidance image of navigation system or other images. But, structurally, execution of the procedures may be determined in compliance with either the condition of running or stoppage of the own car or the condition of the display on the display 15 being a running route guidance image of navigation system or other images.

Firstly, when the ignition switch 20 is turned on, the control unit 2 executes a running assist program in step S100, carrying out an initialization process. In the initialization process, the processing area initialization flag explained in connection with the step S30 in FIG. 3 is set to ON. At that time, various kinds of programs including a navigation program may be executed concurrently.

Subsequently, in step S110, the control unit 2 decides whether the obstacle detection start switch 21 is ON.

Then, with the obstacle detection start switch turned on, the control unit 2 executes, in step S120, a process for receiving the obstacle detection result from the on-vehicle camera unit 1.

Thereafter, in step S130, the control/alarm determination processing unit 33 determines control contents and alarm contents in accordance with the position, size and existence probability of the obstacle.

When the car control is determined, the control/alarm processing unit 34 transmits, in step S140, signals for control to the actuators such as brake and steering. When the alarming is determined, the control/alarm processing unit 34 gives, in stop S140, an alarm to the driver by using either the display or the loudspeaker or both the display and the loudspeaker. The alarm may be raised by using vibration of the seat belt, accelerator, brake pedal and/or the seat, in addition to the use of the display and/or the loudspeaker.

Details of the processes in steps S30, S40 and S60 to S80 in FIG. 3 and in steps S130 and S140 in FIG. 4 will now be described.

Firstly, the contents of the process in step S30 carried out by the image processing accuracy determination unit 29 will be explained. The image processing accuracy determination unit 29 determines a size wt of an object for which the accuracy of measurement of the separation distance from the own car of the object is less than a permissible value. Where the lateral width in real space of the object is W, the lateral width on image of the object is w and the focal length of camera is f, the separation distance of object Z can be determined from $Z=(f \times W)/w$. Further, where the resolution of object width on image is rs, the minimum value of lateral width w on image of the object, for which $(f \times W)/(w+rs)-(f \times W)/w$ exceeds a predetermined value can be set to, for example, wt (see FIG. 5A). Here, the resolution rs corresponds to, for example, the size of one pixel of the image pickup device and it is precedently stored in the ROM or is defined as a constant in the program.

Figure 5A:
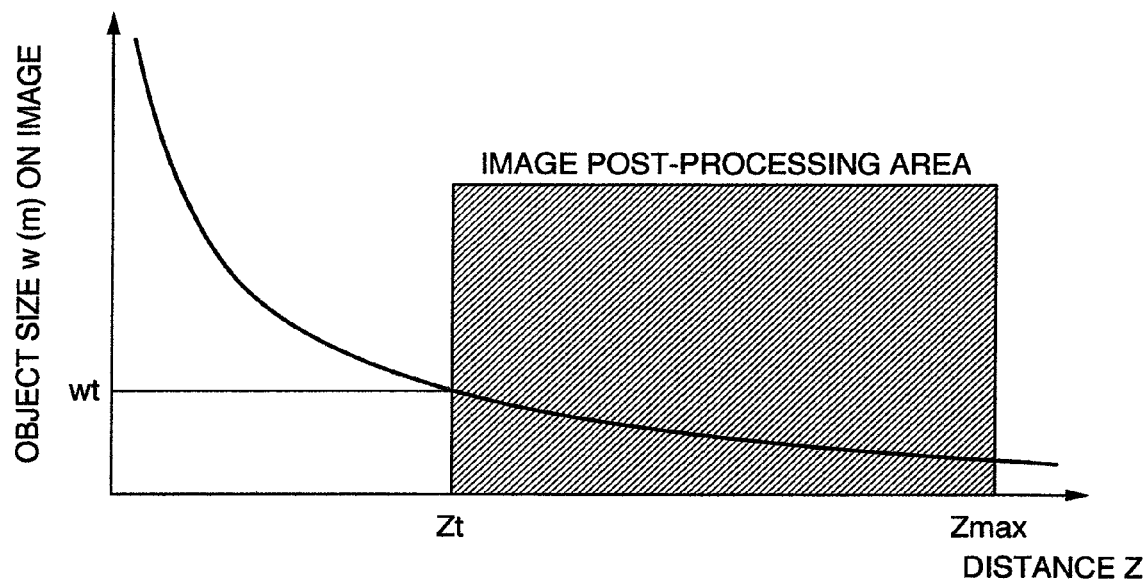
FIGS. 5A and 5B are graphs useful to explain operation of an image post-processing area determination unit of the image processing apparatus in the embodiment.
Figure 5B:
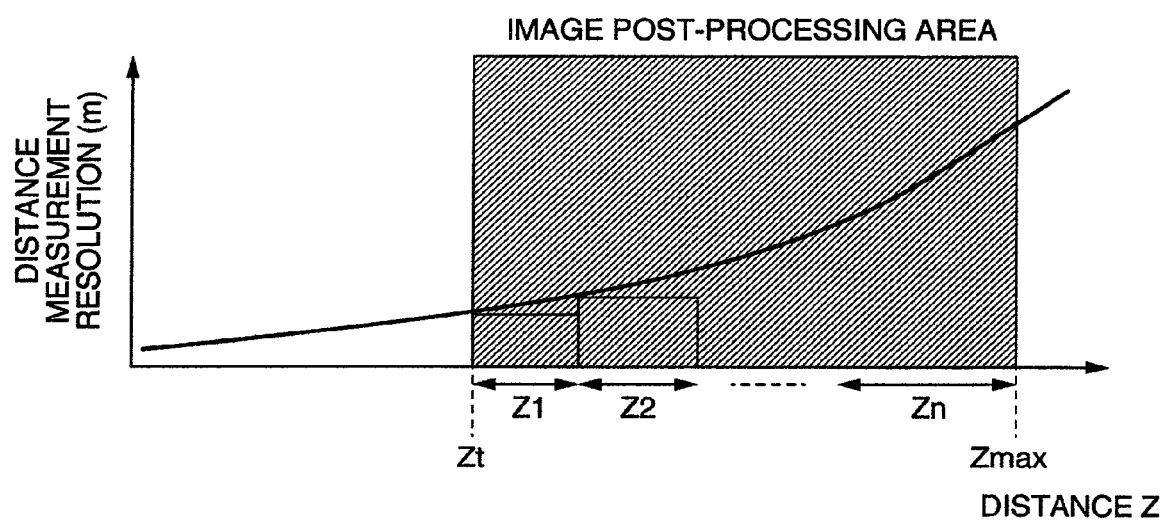
Figure 6:
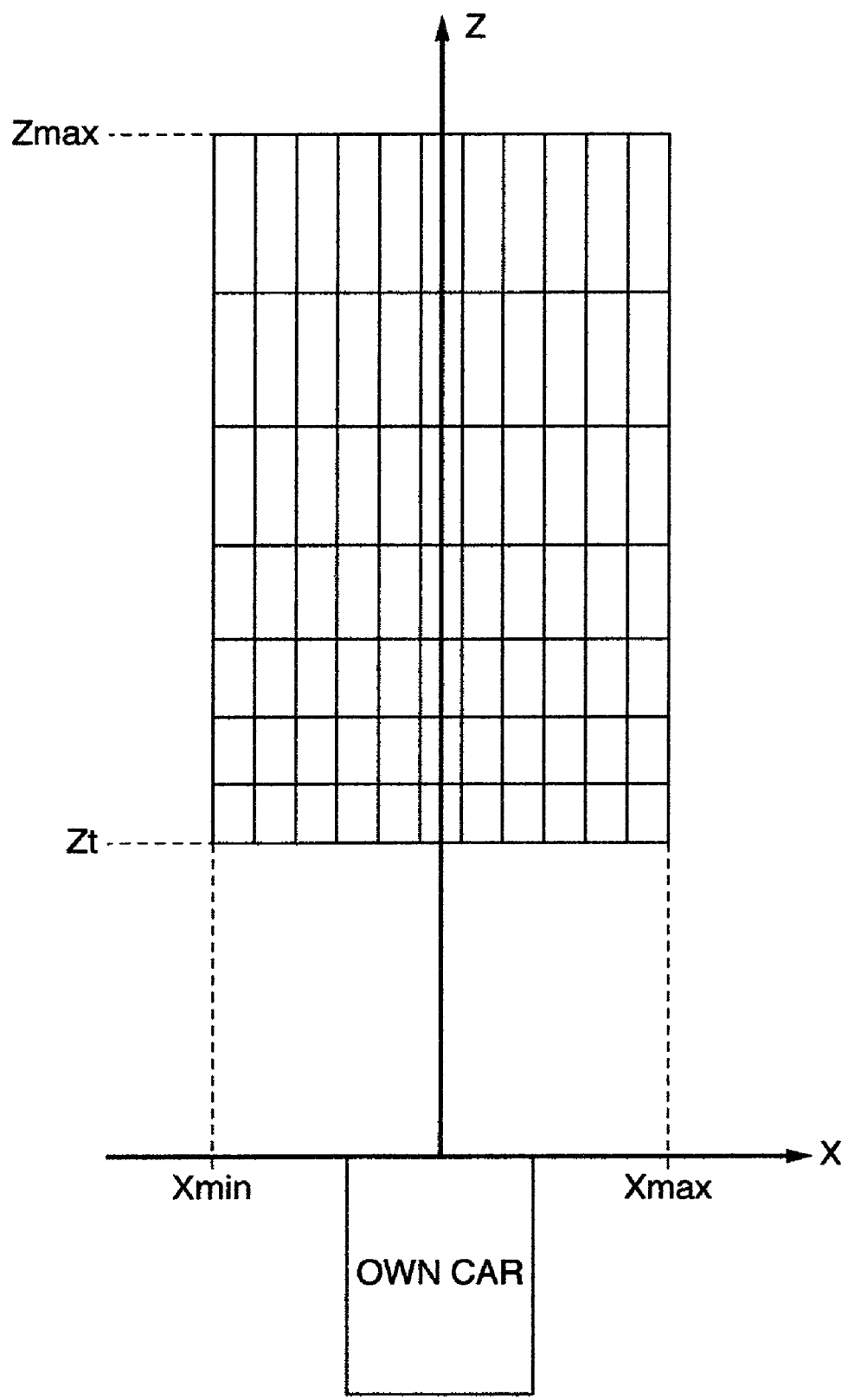
FIG. 6 is a diagram useful to explain operation of the image post-processing area determination unit of the image processing apparatus in the embodiment.

Next, operation of the image post-processing area determination unit 30 of the image processing apparatus according to the present embodiment will be described with reference to FIGS. 5A and 5B and FIG. 6. FIGS. 5A and 5B and FIG. 6 are useful in explaining the operation of the image post-processing area determination unit of the image processing apparatus according to the present embodiment of the invention.

The image post-processing area determination unit determines, in accordance with the object size on a picked up image, an area for which the image post-processing is done. This is because the smaller the object size on the picked up image, the more the reliability of object detection becomes degraded but by performing the image post-processing, the detection performance can be improved. For example, an image post-processing area can be determined as will be described below.

If an object having its lateral width in real space of W or more is treated as a detection target, the minimum value w on the picked up image of lateral width of the detection target can be expressed by $w=(f \times W)/Z$. Then, the lateral width W in real space of the object and the focal length f of the camera are determined and if an area, in which the minimum value w on the picked up image of lateral width of the detection target object is less than the minimum value wt determined by the image processing accuracy determination unit 29, is set as a processing target of the image post-processing, the image post-processing area can be an area defined by $Zt (=(f \times W)/wt)$ or more as shown in FIG. 5A.

Then, the resolution (Z1, Z2, ..., Zn) in the image post-processing area shown in FIG. 5B can be determined by, for example, equation (1) as below.

$$\left.\begin{aligned} Z1 &= (f \times W)/(f \times (w+rs)) - (f \times W)/f(f \times w) \\ Z2 &= (f \times W)/(f \times (w+rs \times 2)) - (f \times W)/(f \times (w+rs)) \\ Zn &= (f \times W)/(f \times (w+rs \times n)) - (f \times W)/(f \times (w+rs \times (n-1))) \end{aligned}\right\} \quad (1)$$

Namely, the resolution is lowered in proportion to the remoteness or the degree of separation from the own car as indicated in equation (1). By lowering the resolution proportionately to the remoteness in this manner, the number of cells can be decreased and the calculation quantity can be reduced. For this process, results of calculation of processing area are saved in advance in the ROM or are held as constants in the program.

Latticed image post-processing areas determined as above are illustrated in FIG. 6. Z-direction indicates the distance frontal of the own car. X-direction indicates the distance right and left sideward of the own car.

In FIG. 6, Zmax is the maximum detection distance of an object and Zt is the minimum distance of the image post-processing area explained in connection with FIGS. 5A and 5B. Namely, between distance Zt and distance Zmax, the latticed image post-processing area exists in Z-direction. When the detection distance left sideward of the own car is Xmin and the detection distance right sideward of the own car is Xmax, the detection area width in x-direction exists ranging from Xmin to Xmax.

Then, over the distances Zt to Zmax, the area of the width of Xmin to Xmax is latticed. The latticing may be accomplished at intervals of equidistance in both the X- and Z directions. In the present embodiment, however, the resolution (Z1, Z2, ..., Zn) is lowered in proportion to remoteness of distance Z in Z-direction as has been explained in connection with FIG. 5B. In respect of the individual lattice cells, the probability such as existence probability of an object is determined and the presence/absence of the object is decided from the result of detection of a candidate for object by the image processing unit 31 and its existence probability.

The W, f, Zmax, Xmin and Xmax are stored in advance in the ROM or set as constants in the program.

In an area closer to the own car than distance Zt, the possibility of erroneous detection of objects is small and therefore, the aforementioned probability is not used for the area and the presence/absence of an object is determined from the result of detection of an object candidate by the image processing unit 31.

By determining the latticed image post-processing area as described above, the number of cells can be reduced as compared to the conventional method of latticing the entire area as described in WO 2007/028932. This will be explained more specifically. Where x is 0 at the position of the own car in X-direction, the detection distance Xmin in left direction is −20 m, for example, and the detection distance Xmax in right direction is +20 m, for example. Then, the detection area extending in right and left directions is divided at intervals of 0.5 m, for instance. Where the position of the own car is 0 in Z-direction, the maximum detection distance Zmax of object is 100 m, for instance. In the conventional method, the detection area is divided or latticed in Z-direction at intervals of 1.0 m, for example.

Consequently, in the conventional method, division by 80 is done in X-direction and the distance 0 m to Zmax is divided by 100 in Z-direction, so that the number of cells is 8000.

Where the focal length f is, for example, 4 mm, the object width W is 1500 mm and the cell size of pickup device is 0.005 mm represented by rs, if the image recognition accuracy decreases at 20 pixels or less of the object width w on the image, Zt amounts to 60 m and hence, it suffices that the image post-processing is carried out for an area of 60 m or more. In the case of a pedestrian being targeted, the object width W amounts to about 500 mm and therefore, 20 m or more is handled as the image post-processing area.

When, in the present embodiment, division by 80 is in X-direction and the distance Zt to Zmax is divided by 40 in Z-direction under the condition that the minimum detection distance Zt is 60 m and equidistant division is applied in Z-direction, the number of cells amounts to 3200, indicating that the number of cells can be reduced by 60% of the conventional cell number. Further, in the present embodiment, the resolution (Z1, Z2, ..., Zn) is lowered in proportion to the remoteness of distance Z in Z-direction and the division by 80 is in x-direction and the division of the distance Zt to Zmax by 20 is in Z-direction, so that the number of cells amounts to 1600, indicating that the number of cells can be reduced by 80% of the conventional cell number. As a result, according to the present embodiment, the cell number can be reduced as compared to the conventional cell number and so the time required for image processing can be shortened.

Next, by making reference to FIGS. 7A and 7B and FIGS. 8A and 8B, different methods of determining the post-processing area by the image post-processing area determination unit 30 of the image processing apparatus according to the present embodiment will be described.

FIGS. 7A and 7B and FIGS. 8A and 8B are useful in explaining different methods of determining the post-processing area by the image post-processing area determination unit of the image processing apparatus according to the present embodiment of the invention.

Figure 7A:
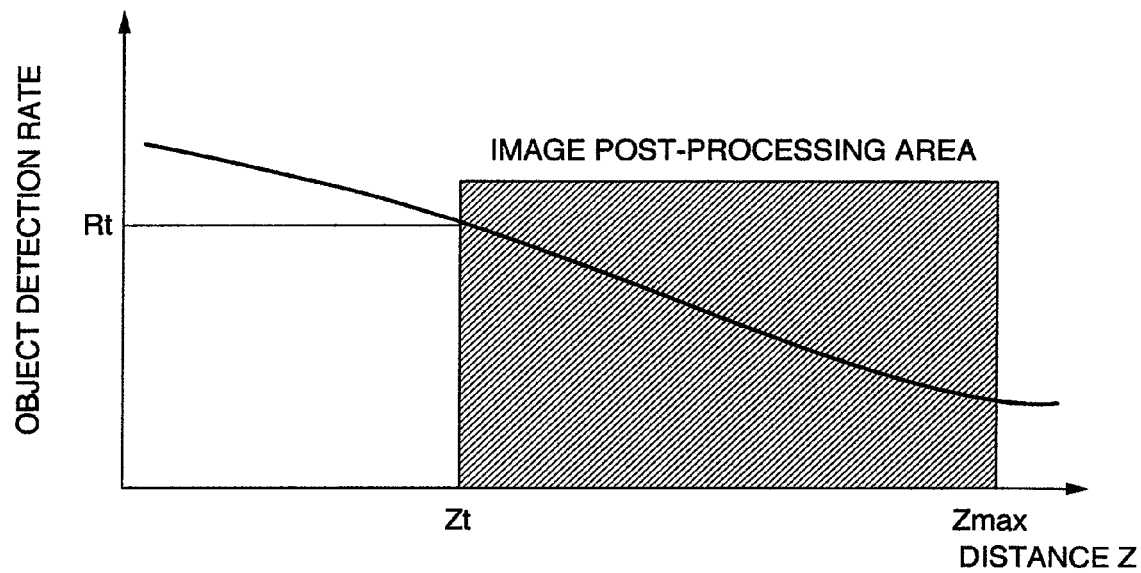
FIGS. 7A and 7B are graphs useful to explain different post-processing area determining methods in the image post-processing area determination unit of the image processing apparatus in the embodiment.

Illustrated in FIG. 7A is an example where the image post-processing area is determined on the basis of an object detection rate indicative of a rate by which the object can be detected correctly.

The object detection rate is a numerical value indicating a rate of detectable objects to all objects. Then, where wt represents an object size on image at which the object detection rate begins to fall below Rt, W represents an object size in real space and f represents a focal length, an area exceeding a distance Zt indicated by Zt=W/(f×wt) can be set as the image post-processing area.

Figure 7B:
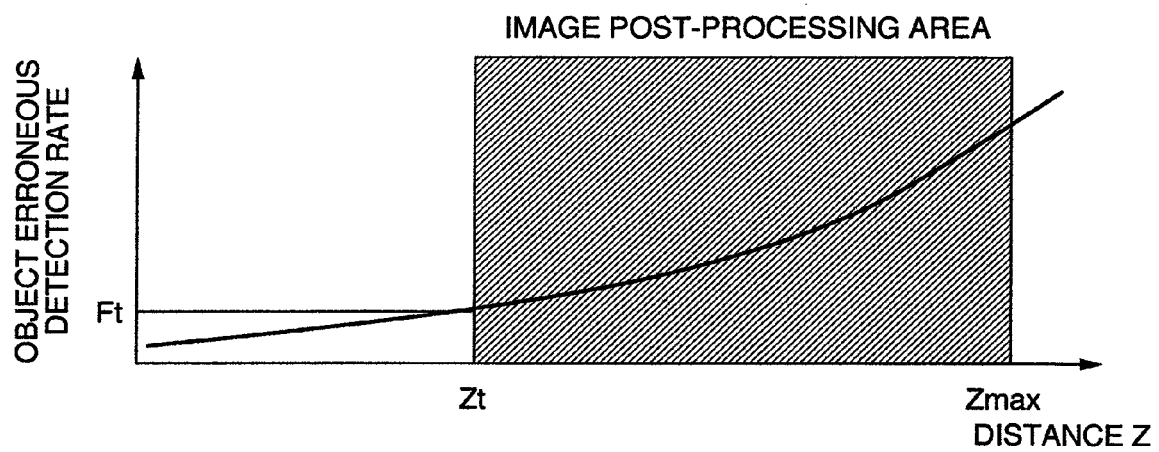

Illustrated in FIG. 7B is an example where the image post-processing area is determined on the basis of an object erroneous detection rate indicative of a rate by which the object is detected erroneously.

The object erroneous detection rate is a numerical value indicative of a rate of erroneously detected objects to all objects. Then, where wt represents an object size on image at which the object erroneous detection rate exceeds Ft, W represents an object size in real space and f represents a focal length, an area exceeding the distance Zt indicated by Zt=W/(f×wt) can be set as the image post-processing area.

Figure 8A:
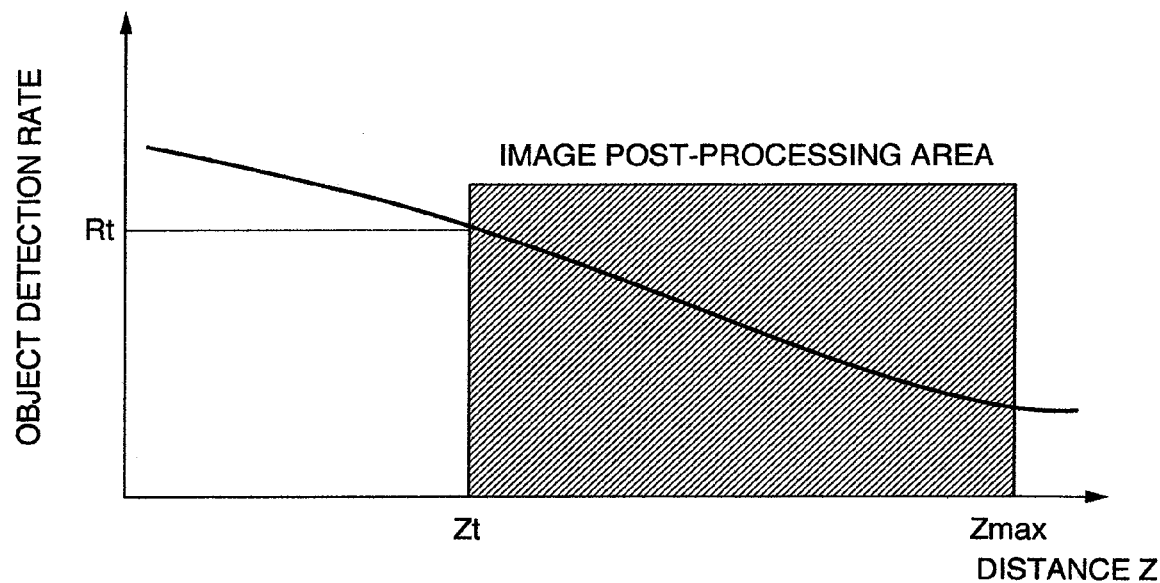
FIGS. 8A and 8B are graphs useful to explain still different post-processing area determining methods in the image post-processing area determination unit of the image processing apparatus in the embodiment.
Figure 8B:
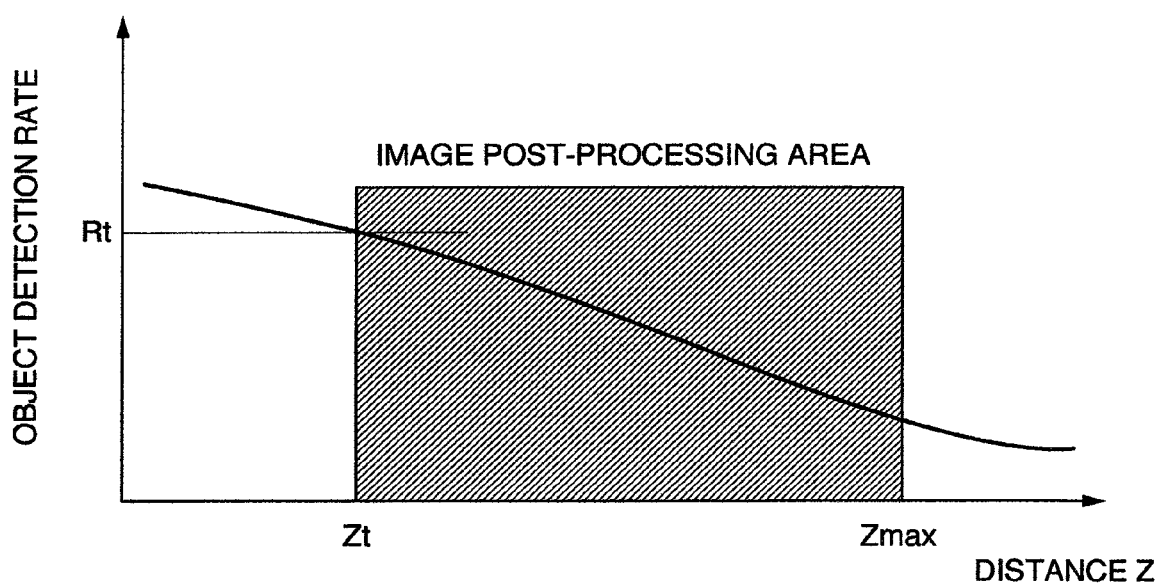

At that time, each of the object detection rate and object erroneous detection rate differs under the influence of the image pickup environment such as day or night or rain or mist and therefore, the image post-processing area may be changed between the mode suitable for fine weather as shown in FIG. 8A and the mode suitable for rainy/misty weather as shown in FIG. 8B.

Next, operation of the image processing unit 31 will be described. The image processing unit 31 executes the process in step S70 to detect a candidate for object through template matching, for example, and determines the distance on the basis of a size w on image of a detected object pursuant to Z=(f×W)/w to thereby obtain a three-dimensional position.

Then, the image post-processing unit 32 executes the process in step S80 to calculate the existence probability of an object in respect of each cell in the manner exemplified in the following.

The image post-processing unit 32 estimates the probability of the presence of an object in each cell and the probability of velocity in the manner described below. Here, random variables of the respective probabilities are defined as follows.

"C" is an index for specifying each cell.

"A" is a past cell having an influence upon a cell c in the two-dimensional lattice.

"Z" is an observation value at the cell c.

Velocity V given by equation (2) in the following is the velocity at the cell c and is made to be discrete into n.

$$V \in v = \{v_1, \ldots, v_n\} \quad (2)$$

State O, $O^{-1}$ indicative the presence/absence given by equation (3) as below shows a state as to whether or not an object is present at the cell c.

$$O, O^{-1} \in O \equiv \{occ, emp\} \quad (3)$$

Indicated by O is the present state and by $O^{-1}$ is the past state. The state corresponding to "occ" indicates the presence of an object and the state corresponding to "emp" indicates the absence of an object.

Taking the independency of the individual random variables into account, the probability P can be expressed by the following equation (4):

$$P(C,A,Z,O,O^{-1},V) = P(A)P(V|A)P(C|V,A)P(O^{-1}|A)P(O|O^{-1})P(Z|O,V,C) \quad (4)$$

The individual probabilities will be given hereunder. Since events desired to be estimated finally are the presence or absence (O) of an object in each cell and the velocity (V) of the object, the probability a posteriori P (V, O|Z, C) of the presence and velocity of the object is calculated from equation (5).

$$P(V, O \mid Z, C) = \frac{\sum_{A,O^{-1}} P(C, A, Z, O, O^{-1}, V)}{\sum_{A,O,O^{-1},V} P(C, A, Z, O, O^{-1}, V)} \quad (5)$$

Further, the numerator of the right side of equation (5) equals equation (6).

$$P(V, O, Z, C) = P(Z \mid O, V, C) \left[ \sum_{A,O^{-1}} P(A)P(V \mid A)P(C \mid V, A)P(O^{-1} \mid A)P(O \mid O^{-1}) \right] \quad (6)$$

Where the presence or absence state O is "occ" for the presence and is "emp" for the absence and the velocity is represented by v1, ..., vk, ..., vn, equation (6) can be reduced to equations (7) to (10) for individual cases.

$$\alpha(occ, v_k) = \sum_{A,O^{-1}} P(A)P(v_k \mid A)P(C \mid V, A)P(O^{-1} \mid A)P(occ \mid O^{-1}) \quad (7)$$

$$\alpha(emp, v_k) = \sum_{A,O^{-1}} P(A)P(v_k \mid A)P(C \mid V, A)P(O^{-1} \mid A)P(emp \mid O^{-1}) \quad (8)$$

$$\beta(occ, v_k) = P(Z \mid occ, v_k)\alpha(occ, v_k) \quad (9)$$

$$\beta(emp, v_k) = P(Z \mid emp, v_k)\alpha(emp, v_k) \quad (10)$$

Equation (7) indicates the probability that an object exists at the cell c and moves at velocity vk and equation (8) indicates the probability that at the cell c an object does not exit but the value of velocity is vk.

Then, by substituting l(vk) for the denominator of equation (5), l(vk) is given by equation (11).

$$l(v_k) = \beta(occ, v_k) + \beta(emp, v_k) \quad (11)$$

From the above equations, the probability P (occ, vk|Z, C) that an object is present at the cell C and moves at velocity vk can be obtained from equation (12).

$$P(occ, v_k | Z, C) = \frac{\beta(occ, v_k)}{l(v_k)} \quad (12)$$

Thereafter, the probabilities of O and V can be obtained from the following equations (13) and (14), respectively. By applying the result to the calculation for all cells, an existence probability map and a velocity probability map can be obtained in association with the road surface latticed to cells.

$$P(O | Z, C) = \sum_V P(V, O | Z, C) \quad (13)$$

$$P(V | Z, C) = \sum_O P(V, O | Z, C) \quad (14)$$

In the process of step S90, the image post-processing unit 32 uses the detection result of object candidate by the image processing unit 31 and the existence and velocity probability maps as well to decide the presence or absence of an object and outputs the result. For example, when a probability at a cell corresponding to a three-dimensional position of an object candidate exceeds a predetermined value P thr, the presence of the object is determined and the three-dimensional position, size and existence probability of the object are outputted.

Figure 9:
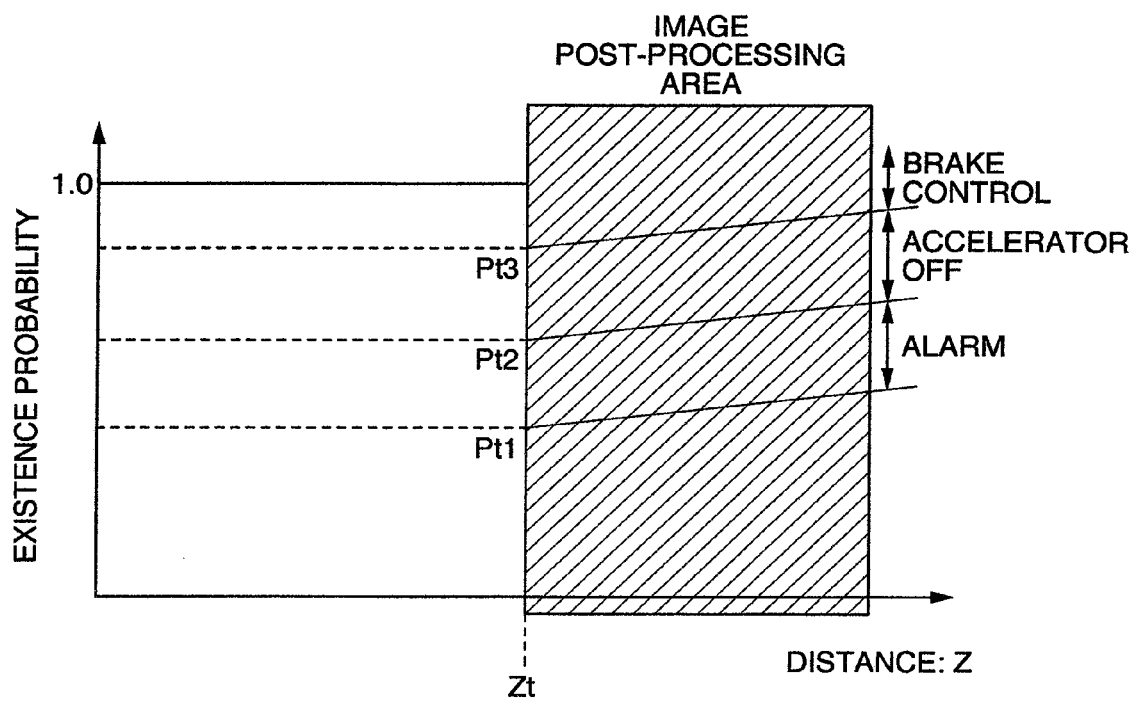
FIG. 9 is a graphical representation for explaining operation of control/alarm determining process in the image processing apparatus in the embodiment.

Referring now to FIG. 9, operation of the control/alarm determination processing unit 33 will be described. Illustrated in FIG. 9 is an diagram useful to explain the operation of the control/alarm determination processing unit of the image processing apparatus according to the present embodiment of the invention.

The control/alarm determination processing unit 33 of control unit 2 responds to, for example, the object existence probability as shown in FIG. 9 to make a decision as to whether the brake control is to be executed, whether the brake control is not done but only accelerator OFF operation is to be executed or whether control is not done but only alarm is to be issued.

For example, when the detection result of object candidate by the image processing unit 31 indicates that an object candidate is present at distance Zt, the contents of control alarm is determined in accordance with an existence probability of the object candidate. If the existence probability of the object candidate at the distance Zt is less than a predetermined value Pt1, nothing is done. If the existence probability of the object candidate at the distance Zt lies between predetermined values Pt1 and Pt2, only an alarm is issued. If the existence probability of the object candidate at the distance Zt lies between predetermined values Pt2 and Pt3, only accelerator OFF operation is done. If the existence probability of the object candidate at the distance Zt exceeds predetermined value Pt3, the brake control is executed.

Then, the predetermined value for determining the contents of control/alarm is so set as to gradually increase as the distance Z increases as shown in FIG. 9.

In this phase, the probability statistical value is not calculated for an object lying in an area outside the image post-processing area, that is, the object lying more closely than the distance Zt and hence a preset value (1.0 in the illustrated example) is outputted. Accordingly, when the result of detection of an object candidate by the image processing unit 31 indicates that the object candidate is detected at a position closer than the distance Zt, the brake control is executed without exception.

When determining the car control, the control/alarm determination processing unit 33 calculates the strength by which the brake is stepped on and transmits a signal indicative of the calculated strength to the actuator. By using value P of probability, the control strength Go may be determined pursuant to Go=G×P where Go is equivalent to deceleration attributable to braking, G represents maximum deceleration attributable to automatic control and P represents the object existence probability the image processing unit outputs.

When raising an alarm is determined, an alarm message and an image in which the object detection result is superimposed on a picked up image obtained from the camera 4 are displayed on the display. Also, an alarm message may be given in sound by means of the loudspeaker.

In the present embodiment, a car navigation system and a map database may be provided in addition to the construction set forth so far so that the running-on road contour and the kind of road such as super expressway or general road may be decided from the car position obtained from the car navigation and map data obtained from the map database and on the basis of the thus determined road contour and kind of road, values of W, wt, Zmax and Xmin may be determined. For example, when the values of wt and Zmax are 60 m and 100 m, respectively, for the general road, the wt and Zmax are set to 80 m and 120 m, respectively, for the super expressway, thus ensuring that an object lying more remotely can be decided by using the existence probability under the influence of higher speed. In the case of super expressway, Xmin can be reduced from 20 m to 10 m. With Xmin set to 20 m for a straight road, Xmin may be set to 30 m for a curved road to broaden the detection range on the right and left sides of the car to facilitate detection of a car running ahead along the curved road. In this manner, the processing area can be determined depending on whether the road is super expressway or general road. For example, during running on the super expressway, a processing area for remote distance can be set and during running on the general road, a processing area for near distance can be set.

Alternatively, in the present embodiment, the processes in the on-vehicle camera unit 1 may be executed in the control unit 1 and conversely, the processes in the control unit 2 may be executed in the on-vehicle camera unit 1.

As has been described, according to the present embodiment, when processing an image photographed by the on-vehicle camera and detecting an object, the probability of existence of an object based on past information $(O^{-1})$ and statistical information $(O)/(O^{-1})$ is used through the probability statistical process to make it possible to realize highly accurate object detection. In addition, by calculating an area needing the image post-processing and the resolution by means of the image post-processing area determination unit, the number of cells can be reduced. Namely, even when the road surface is latticed and the probability statistical processing for calculating the probabilities in respect of the individual cells is practiced, the object recognition processing can be carried out on real time base. Then, with the output of the on-vehicle camera unit endowed with the probability statistical value in addition to the position and size of the object, smooth control and alarm processing can be realized.

Turning now to FIG. 10 to FIGS. 12A and 12B, the configuration and operation of an image processing apparatus according to a second embodiment of the present invention will be described.

Firstly, with reference to FIG. 10, the configuration and operation of an on-vehicle system using the image processing apparatus according to the second embodiment of the invention will be described.

Figure 10:
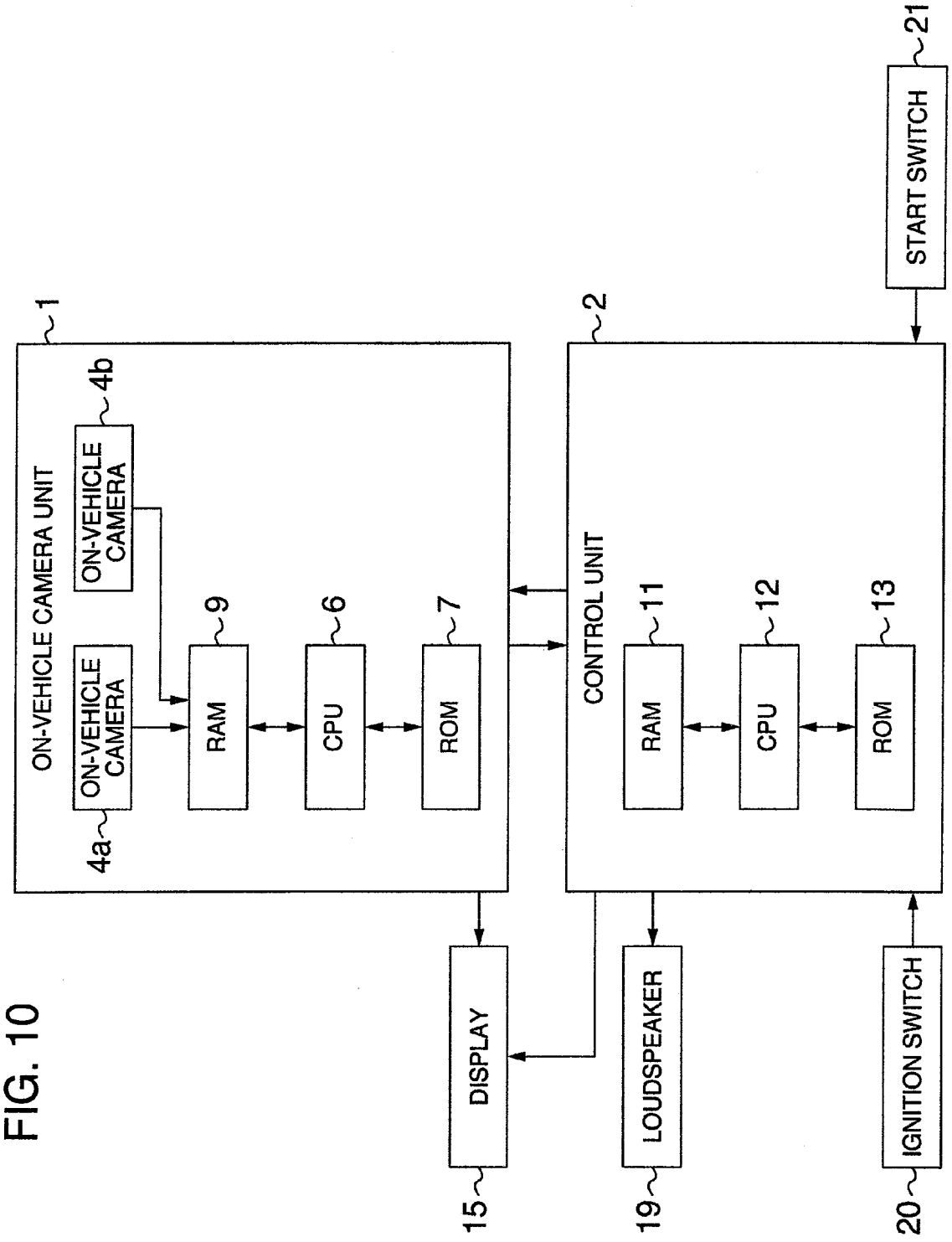
FIG. 10 is a block diagram illustrating the configuration of an on-vehicle system using an image processing apparatus according to another embodiment of the invention.

The on-vehicle system using the image processing apparatus according to this embodiment of the invention is constructed as illustrated in block diagram form in FIG. 10. Components identical to those in FIG. 1 are designated by identical reference numerals.

An on-vehicle camera unit 1A of the image processing apparatus according to this embodiment recognizes an environment surrounding an own car as a stereoscopic image by means of two on-vehicle cameras 4a and 4b.

The number of on-vehicle cameras used is not limited to two but may be three or more. Alternatively, an image processing unit separate from the on-vehicle camera may fetch images from the on-vehicle cameras 4a and 4b and may process them.

Next, the detection principle of the stereoscopic camera used in the image processing apparatus according to this embodiment will be described with reference to FIG. 11.

Figure 11:
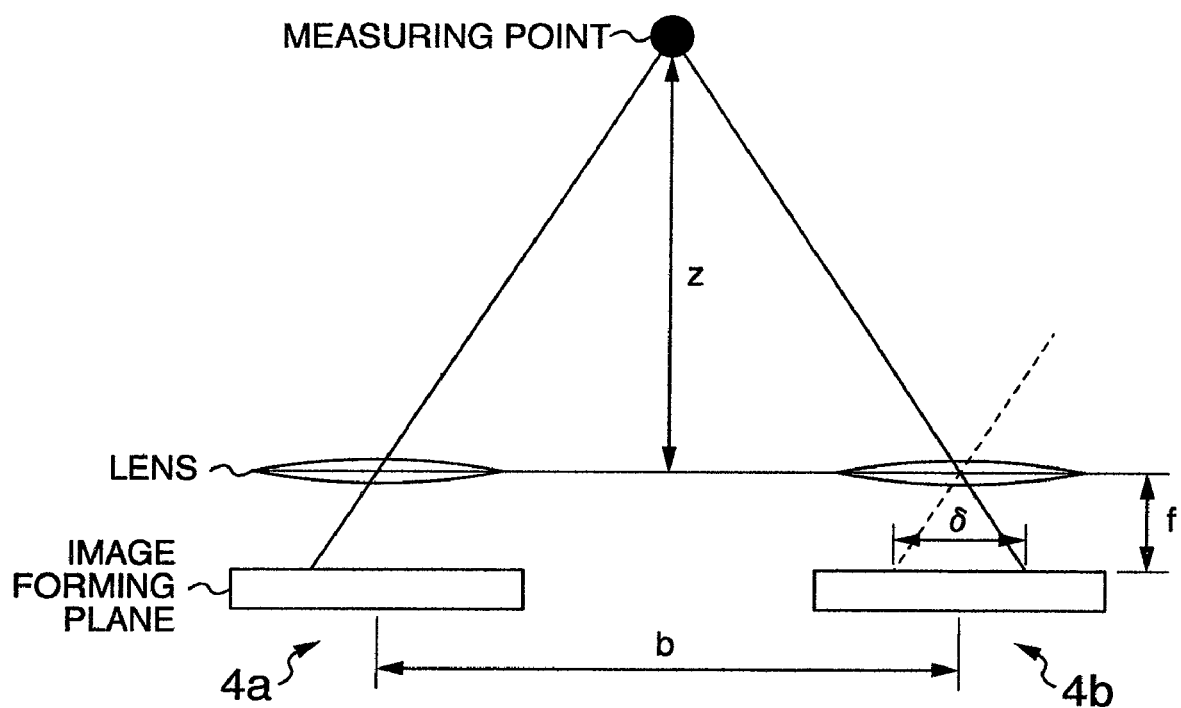
FIG. 11 is a diagram for explaining the principle of detection by a stereoscopic camera used in the image processing apparatus of FIG. 10 embodiment.

FIG. 11 is useful in explaining the detection principle of the stereoscopic camera used in the image processing apparatus according to this embodiment of the invention.

Structurally, in the stereoscopic camera used in the on-vehicle camera unit 1A, the difference in sight (parallax) is caused when the on-vehicle plural cameras 4a and 4b photograph the same measuring point and the parallax is used to determine the distance through the principle of triangulation. In the figure, Z represents the distance between a set of the cameras 4a and 4b and the measuring point, f represents the focal length of each of the cameras 4a and 4b, b represents the pitch between the cameras 4a and 4b and δ represents the angle of field of view of each of the cameras 4a and 4b.

Reverting to FIG. 10, the on-vehicle camera unit 1A and control unit 2 have each functional structure similar to that explained in connection with FIG. 2. The on-vehicle camera unit 1A is mounted on a car and constitutes an on-vehicle system together with the control unit 2. In the system, the on-vehicle camera unit 1A detects an obstacle existing frontally of the own car and on the basis of the detection result, the car is controlled or a risk is informed to the driver under the control of the control unit 2.

The on-vehicle camera unit 1A is attached to, for example, a room mirror inside the compartment of the own car and is operative to photograph the scene frontal of the own car at a predetermined angle of depression making to the camera attaching position. An image in front of the own car photographed by the on-vehicle cameras 4a and 4b is fetched to the RAM 9 inside the on-vehicle camera unit 1A so as to detect the obstacle frontal of the own car and when it is determined that the own car is risky to collide with the obstacle, the result of detection is drawn on a display image and under the control of the control unit 2, the event is informed to the driver by means of the display 15 and the loudspeaker 19 as well or either the display 15 or the loudspeaker 19. Or, the own car can be controlled by means of the control unit 2 to avoid or mitigate collision.

Functionally, the image processing unit 31 processes images picked up by the cameras 4a and 4b, calculates the parallax pixel by pixel to prepare a map of parallax, detects a candidate for object through pattern matching, for example, and calculates a three-dimensional position of the detected object.

Under the execution of the obstacle detection program by the CPU 6 as described previously, the on-vehicle camera unit 1A constructed as above can process the image and calculate a probability statistical value in addition to the position and size of the object. Then, an image in which the recognition result is superimposed on the input image is outputted to the display 15 and the recognition result is transmitted to the control unit 2, so that if a risk of collision is determined under the control of the control unit 2, control for mitigation/avoidance of collision is carried out or an alarm sound is raised to inform the car driver of the risk.

Flow of a series of procedures ranging from the detection of an obstacle to the delivery of the detection result in the on-vehicle camera unit 1A constructed as above is similar to that shown in the flowchart of FIGS. 3 and 4.

The processes in the steps S30, S40, S70 and S90 in FIG. 3 and in the step S130 in FIG. 4 will be described hereunder one by one.

In the step S30 carried out by the image processing accuracy estimation unit, a parallax dt at which the distance measurement accuracy, for example, is below a permissible value is determined. For example, the processing area of the image post-processing can be determined as below. Where the parallax is d, the resolution of parallax is δd, the pitch between cameras is B and the focal length is f, distance Z to pixels concerned is then indicated by equation Z=B×f/d. When permissible error δZ of distance measurement accuracy is now defined, the distance measurement accuracy exceeds the permissible error value in an area corresponding to the parallax d satisfying the following equation (15).

$$\delta Z < B \times f/(d+\delta d) - B \times f/d \qquad (15)$$

The minimal one of the parallax d satisfying equation (15) is now represented by dt.

Figure 12A:
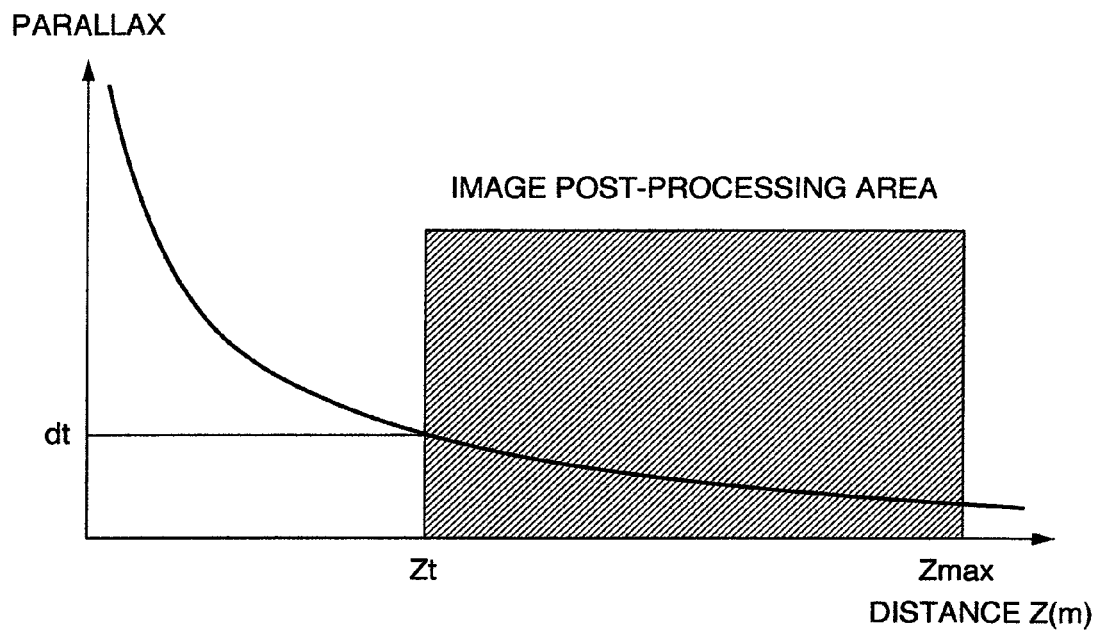
FIGS. 12A and 12B are graphs for explaining the contents of processing by the image post-processing area determination unit in the image processing apparatus of FIG. 10 embodiment.
Figure 12B:
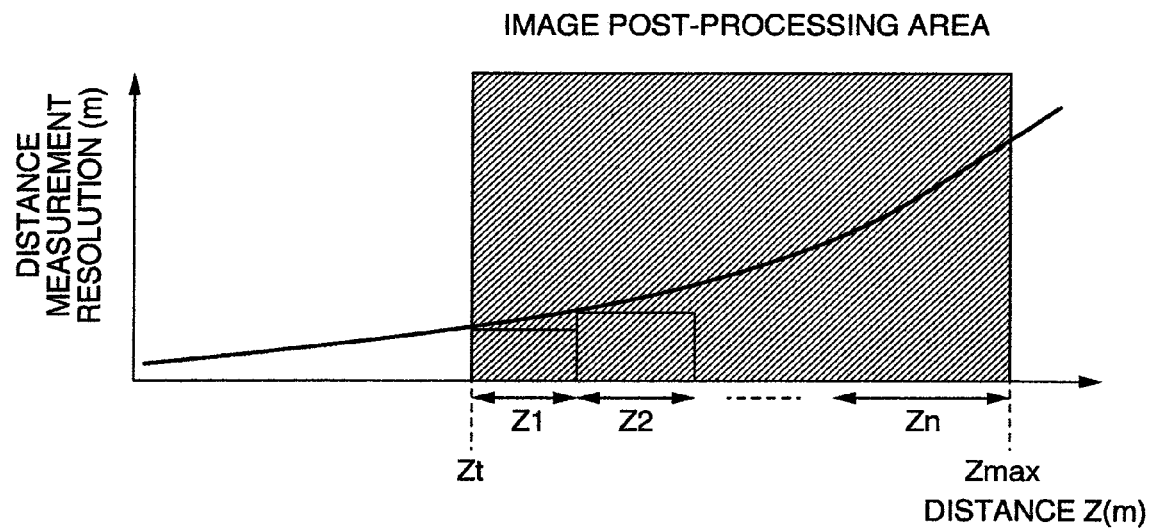

Turning now to FIGS. 12A and 12B, the contents of processing by the image post-processing area determination unit in the image processing apparatus according to this embodiment will be described.

These figures are useful in explaining the contents of processing by the image post-processing area determination unit of the image processing apparatus according to this embodiment of the invention.

In the step S40 carried out by the image post-processing area determination unit, an area for image post-processing is determined on the basis of a value of the aforementioned minimal parallax dt. This is because the smaller, the more the reliability of object detection and distance measurement accuracy decreases and so the detection performance can be improved through the image post-processing. With the distance corresponding to the minimal parallax dt being Zt, the image post-processing area can be an area meeting the distance Zt or more.

Where the maximum detection distance of the object is Zmax and the detection area width is from Xmin to Xmax, the processing area on road surface can be determined as has been explained in connection with FIG. 6. The values of B, f, δZ, Zmax, Xmin and Xmax are stored in the ROM in advance or are constants in the program. Further, the resolution of processing area (Z1, Z2, . . . , Zn) is determined pursuant to the following equation (16), for example.

$$\left.\begin{array}{l}Z1 = B \times f / (d + \delta d) - B \times f / d \\ Z2 = B \times f / (d + \delta d \times 2) - B \times f / (d + \delta d) \\ Zn = B \times f / (d + \delta d \times n) - B \times f / (d + \delta d \times (n-1))\end{array}\right\} \quad (16)$$

Namely, the resolution is lowered in proportion to the remoteness as indicated in equation (16). By lowering the resolution proportionately to the remoteness in this manner, the number of cells can be decreased and the calculation quantity can be reduced. For this process, results of calculation of processing area are saved in advance in the ROM or are held as constants in the program.

In the step S70 carried out by the image processing unit, a candidate for object is detected through, for example, template matching and the distance is determined from a size w on image of the detected object pursuant to Z=W/(f×w), thus obtaining a three-dimensional position.

Further, in the process of step S90 by the image post-processing unit 32, by using the result of object detection by the image processing unit 31 and the probability map, the presence/absence of an object is decided and the decision result is outputted. For example, when the probability at a cell corresponding to the three-dimensional position of the object candidate exceeds the predetermined value Pthr, the presence of an object is determined and mean value and standard deviation of three-dimensional data are calculated from the three-dimensional position, size and existence probability of the object and parallax data of pixels belonging to the detected object are outputted.

Next, the step S130 executed by the control/alarm determination processing unit 33 of control unit 2 will be described. In the control/alarm determination process, as explained in connection with FIG. 9, for example, it is decided in accordance with the object existence probability whether the brake control is executed, whether the brake control is not done but only the accelerator ON/OFF is executed or whether the control is not done but only an alarm is raised. But, even when the existence probability is high, it is uncertain where the object exists if the standard deviation of the three-dimensional data is large and so the control process is so determined as not to be executed.

A car navigation system and a map database may be provided in addition to the construction set forth so far so that the running-on road contour and the kind of road such as super expressway or general road may be decided from the car position obtained from the car navigation and map data obtained from the map database and on the basis of the thus determined road contour and kind of road, values of δZ, Zmax and Xmin may be determined. Thus, the processing area can be determined highly efficiently depending on whether the road is super expressway or general road. For example, during running on the super expressway, a processing area for remote distance can be set and during running on the general road, a processing area for near distance can be set Alternatively, the processes in the on-vehicle camera unit 1A may be executed in the control unit 2 and conversely, the processes in the control unit 2 may be executed in the on-vehicle camera unit 1A.

As has been described, according to this embodiment, when processing images photographed by the on-vehicle cameras 4a and 4b and detecting an object, the probability of existence of the object can be calculated from past information and statistical information through the probability statistical process to make it possible to realize highly accurate object detection. In addition, by calculating an area needing the image post-processing and the resolution by means of the image post-processing area determination unit 30, the number of cells can be suppressed to a minimum. Namely, even when the road surface is latticed and the probability statistical processing for calculating the probability in respect of the individual cells is carried out, the object recognition processing can be executed on real time base. Then, with the output of the on-vehicle camera unit endowed with the probability statistical value in addition to the position and size of the object, smooth control and alarm processing can be implemented.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus comprising:
   an image pickup unit; and
   a processing device including:
   an image processing accuracy estimation unit which estimates an image processing accuracy by calculating a size of an object by which the accuracy of measurement of the distance of the detection object photographed by said image pickup unit becomes a permissible value or less;
   an image post-processing area determination unit which determines, in accordance with the image processing accuracy estimated by said image processing accuracy estimation unit, a partial area inside a detection area of the detection object as an image post-processing area in which an image post-processing is carried out and lattices the determined image post-processing area to cells;
   an image processing unit which processes the image photographed by said image pickup unit to detect a recognition object; and
   an image post-processing unit which determines the presence/absence of the detection object by calculating, in respect of the individual cells inside the latticed area determined by said image post-processing area determination unit, the probability as to whether the recognition object detected by said image processing unit is present in each of the individual cells and the probability as to a direction in which said recognition object moves in each of the individual cells.

2. An image processing apparatus according to claim 1, wherein said image post-processing area determination unit determines as the image post-processing area, an area for which an error in the distance measurement estimated by said image processing accuracy estimation unit is larger than a permissible error.

3. An image processing apparatus according to claim 1, wherein said image post-processing area determination unit determines as the image post-processing area, an area for which the size on a photographed image of the detection object estimated by said image processing accuracy estimation unit is smaller than a predetermined value.

4. An image processing apparatus according to claim 1, wherein said image post-processing area determination unit determines, inside the image post-processing area and on the basis of the image processing accuracy, the resolution which decreases gradually to the remoteness and lattices the image post-processing area to cells on the basis of the resolution.

5. An image processing apparatus according to claim 1, wherein said image post-processing unit calculates the existence probability through probability statistical process.

6. An image processing apparatus according to claim 5, wherein said image post-processing unit delivers an output by adding a probability statistical value such as the probability or variance of the object existence to the result of recognition of the recognition object.

7. An image processing apparatus according to claim 6 further comprising a control unit which determines the contents of control and alarm on the basis of both the recognition result of the recognition object and the probability statistical value concerning the object said image post-processing area determination unit delivers.

* * * * *